(12) United States Patent
Maruyama

(10) Patent No.: US 9,293,982 B2
(45) Date of Patent: Mar. 22, 2016

(54) SWITCHING POWER SUPPLY

(71) Applicant: FUJI ELECTRIC CO., LTD., Kawasaki-shi (JP)

(72) Inventor: Hiroshi Maruyama, Matsumoto (JP)

(73) Assignee: FUJI ELECTRIC CO., LTD., Kawasaki-shi (JP)

( * ) Notice: Subject to any disclaimer, the term of this patent is extended or adjusted under 35 U.S.C. 154(b) by 104 days.

(21) Appl. No.: 14/100,247

(22) Filed: Dec. 9, 2013

(65) Prior Publication Data

US 2014/0185340 A1 Jul. 3, 2014

(30) Foreign Application Priority Data

Dec. 28, 2012 (JP) ................................. 2012-286940

(51) Int. Cl.
*H02M 3/335* (2006.01)
*H02M 1/36* (2007.01)
*H02M 1/32* (2007.01)

(52) U.S. Cl.
CPC *H02M 1/36* (2013.01); *H02M 1/32* (2013.01); *H02M 3/33553* (2013.01)

(58) Field of Classification Search
CPC ..... H02M 3/33507; H02M 3/38; H02M 1/08; H02M 1/38; H02M 3/33553; H02J 9/062
USPC ......... 363/16–17, 21.02, 21.12, 21.16, 21.18, 363/60, 89, 98, 132; 323/222, 225, 323/282–289
See application file for complete search history.

(56) References Cited

U.S. PATENT DOCUMENTS

| 4,975,823 | A * | 12/1990 | Rilly et al. ................. 363/21.16 |
| 7,092,261 | B2 * | 8/2006 | Allwyn ............. H02M 3/33507 363/21.17 |
| 7,362,191 | B2 * | 4/2008 | Chen ....................... H02M 1/44 331/78 |
| 7,697,308 | B2 * | 4/2010 | Huynh ............. H02M 3/33507 323/300 |
| 7,777,474 | B2 * | 8/2010 | Maekawa ............. H02M 3/157 323/288 |
| 8,669,751 | B2 * | 3/2014 | Balakrishnan et al. ....... 323/299 |

FOREIGN PATENT DOCUMENTS

JP 2002-300777 A 10/2002

* cited by examiner

*Primary Examiner* — Rajnikant Patel
(74) *Attorney, Agent, or Firm* — Rossi, Kimms & McDowell LLP

(57) ABSTRACT

In some aspects of the invention, a switching power supply can include a control circuit that conducts feedback control of a pulse width of a driving signal for switching the switching element according to an output voltage and settle the output voltage to a specified voltage level; a frequency reducing circuit that is disposed in the control circuit and reduces a frequency of the driving signal for switching the switching element upon detection of an overload state and limits an output current; and an initial state setting circuit that sets the control circuit to an overload detecting state for a predetermined period of time in a startup period of the control circuit. The initial state setting circuit can pull down a control voltage for a soft start signal for soft starting to the ground potential to inhibit generation of the driving signal and pulls up a feedback voltage signal.

5 Claims, 9 Drawing Sheets

SWITCHING POWER SUPPLY

CROSS-REFERENCE TO RELATED APPLICATION

This application is based on, and claims priority to, Japanese Patent Application No. 2012-286940, filed on Dec. 28, 2012, the contents of which are incorporated herein by reference.

BACKGROUND OF THE INVENTION

1. Field of the Invention

Embodiments of the invention relate to switching power supplies in which rising up performance of an output voltage is improved at a startup period of the power supplies.

2. Description of the Related Art

FIG. 5 shows a schematic construction of a conventionally common switching power supply of a forward type. The switching power supply receives an input voltage Vin that is obtained by full-wave rectification of an AC voltage Vac with a diode bridge circuit DS1 and following smoothing with an input capacitor Cin. The switching power supply is mainly composed of a switching power supply main body 1 provided with a switching element Q that switches the input voltage Vin through a primary winding Ta of a transformer T. The switching power supply main body 1 rectifies an AC voltage generated across a secondary winding Tb of the transformer T with diodes DS2 and DS3, and make the rectified voltage smooth with a smoothing circuit composed of a reactor L and an output capacitor C-out to obtain a specified output voltage Vout.

A power supply IC 2 is a control circuit for ON/OFF-driving the switching element Q. The power supply IC 2 controls driving of the switching element Q basically according to an FB signal given by an output voltage detecting circuit 3 for detecting the output voltage Vout. More specifically, the power supply IC 2, a control circuit, conducts feedback control of a pulse width, i.e. an ON width, of the driving signal for ON/OFF-switching of the switching element Q according to the FB signal. The output voltage detecting circuit 3 detects the output voltage Vout divided with series-connected resistors Ra and Rb. The output voltage detecting circuit 3 delivers the FB signal to the power supply IC 2 through a photo-coupler PC, the FB signal being an error voltage between a voltage set at the shunt regulator SR and a voltage detected with the resistances Ra and Rb.

A power supply input terminal VCC of the power supply IC 2 is supplied with a startup current from the diode bridge circuit DS1 through a resistor R. The startup current charges a capacitor C connected to the power supply input terminal VCC. The power supply IC 2 starts driving the switching element Q when the charged voltage on the capacitor C exceeds a releasing voltage of an under voltage lock out circuit (an UVLO circuit) in the power supply IC 2. When the switching power supply main body 1 begins operation upon starting up of driving the switching element Q, a voltage developed across an auxiliary winding Tc of the transformer T is given to the power supply input terminal VCC through a diode D. After that, the power supply IC 2 operates receiving the voltage delivered from the auxiliary winding Tc through the diode D.

The power supply IC 2 is basically constructed as shown in FIG. 6. The power supply IC 2 comprises an oscillator 21 of a voltage controlled type. The fundamental oscillation frequency of the oscillator 21 is regulated according to the resistance of an external resistance (not shown in the figure) connected to the terminal RT. The oscillator 21 generates a signal with a triangular waveform using charging and discharging process of a capacitor (not shown in the figure) contained in the oscillator 21 as well as a signal with a rectangular waveform in synchronous with the signal with the triangular waveform. A comparator 22 for PWM control compares the signal with the triangular waveform generated in the oscillator 21 with the FB signal and compares the signal with the triangular waveform with a CS signal for soft starting that is generated at the startup of the power supply IC 2 and gradually increases from zero volts. According to the comparison result, the comparator 22 generates a control signal with a pulse width that regulates the ON width of the switching element Q.

More specifically as shown in FIG. 7, the comparator 22 generates the control signal of the pulse width from the timing of a lowest voltage or a bottom of the signal with triangular waveform to the timing at which the voltage with triangular waveform exceeds either one of the FB signal and the CS signal. This control signal is given to an output driver circuit 23 under an operation condition for the switching power supply main body 1, and from the output driver circuit 23, a driving signal OUT for ON/OFF-driving the switching element Q is delivered.

The oscillator 21 is given, through a frequency reducing circuit 24, a VF signal that varies according to the driving signal OUT for switching the switching element Q. The VF voltage is, in the case of forward type switching power supply, a voltage proportional to an ON duty, which is the smoothed driving signal OUT. The frequency reducing circuit 24, when the overload detecting circuit 25 detects an overload protection (OLP) of the switching power supply main body 1, controls the operation of the oscillator 21 corresponding to the VF voltage. More specifically, the frequency reducing circuit 24, when an OLP is detected and the VF voltage is a low voltage that does not reach a predetermined threshold voltage, decreases the oscillation frequency of the oscillator 21 corresponding to the VF voltage, thus the switching frequency of the switching element Q is decreased.

The control to decrease the switching frequency restricts the output current of the switching power supply main body 1 in the event of OLP. According to the output current control, an output voltage-output current characteristic of the switching power supply exhibits a current drooping characteristic as shown in FIG. 8. Japanese Unexamined Patent Application Publication No. 2002-300777 (also referred to herein as "Patent Document 1") discloses a now widely known protection technology in which the switching frequency is reduced in an event of overload to droop the output current, thereby avoiding delivering overcurrent to the load in the secondary side in a switching power supply.

A comparator 26 in FIG. 6 detects overcurrent through the switching element Q from the signal given to an IS terminal, and a comparator 27 detects overload from the FB signal. The comparator 28 judges a voltage at the power supply input terminal VCC for under-voltage locking out (UVLO). The power supply IC 2 of FIG. 6 further comprises an internal power supply 41 for 5 V and an initialization circuit 42 for generating an initial resetting signal.

In the switching power supply described above, when the voltage given at the power supply input terminal VCC increases after startup of the power supply and exceeds the voltage for under-voltage locking out of the power supply IC 2, the under-voltage locking out function is released, and current supply begins to the FB terminal and the CS terminal, to which respective capacitors are connected, of the power supply IC 2. When an FB signal and a CS signal at the FB terminal and the CS terminal exceed predetermined value, the oscillator 21 starts oscillation operation.

Immediately after startup of the switching power supply, the power supply IC 2 starts driving the switching element Q in a normal mode. With this operation, the voltage of the FB signal becomes high as shown in FIG. 9. When the voltage of the FB signal exceeds a predetermined threshold value Vth for overload protection (OLP), the power supply IC 2 transfers from the normal mode to an overload mode. In this startup period, the VF voltage grows slowly with the driving operation of the switching element Q. As a result, the current drooping control on the output current works simultaneously with the transition to the overload mode. Consequently, the switching frequency of the switching element Q decreases accompanying the transition to the overload mode.

However, in the case the DC output voltage Vout fast rises up in the startup period, or in the case the transition to the overload mode occurs during the rising period of the output voltage Vout, the frequency of the driving signal OUT, which is a switching frequency of the switching element Q, decreases abruptly as shown in FIG. 9. As a consequence, the increase in the DC output voltage Vout temporarily stops with the transition to the overload mode. Thus, the ascending curve of the DC output voltage Vout becomes so-called stepwise as the part indicated by the broken circle in the bottom figure in FIG. 9. If the DC output voltage Vout does not exhibit a monotonic increase characteristic, it may cause power ON resetting of an IC in the subsequent stage connected to the secondary side output terminal, or malfunction of the under-voltage locking out function.

SUMMARY OF THE INVENTION

Embodiments of the invention provide a switching power supply that improves rise up performance of the output voltage at the startup period and preventing an IC in the subsequent stage connected to the secondary side output terminal from undergoing power ON resetting and avoiding erroneous functioning of an under-voltage locking out function.

In some embodiments, a switching power supply of the present invention comprises: a switching power supply main body that switches an input voltage through a switching element at a specified frequency to apply the switched voltage to a primary winding of a transformer, and rectifies and make smooth an AC voltage developed across a secondary winding of the transformer to obtain a specified output voltage; a control circuit that conducts feedback control of a pulse width of a driving signal for switching the switching element according to the output voltage of the switching power supply main body and settles the output voltage to a specified voltage level; a frequency reducing circuit that is disposed in the control circuit and reduces a frequency of the driving signal for switching the switching element upon detection of an overload state of the switching power supply main body and limits an output current of the switching power supply; and an initial state setting circuit that sets the control circuit to an overload detecting state for a predetermined period of time in a startup period of the control circuit.

In some embodiments, an oscillation frequency of which varies corresponding to a feedback voltage (an FB signal) generated by detecting the output voltage of the switching power supply main body, with the FB signal, and also compares the output signal of the oscillator with a control voltage for soft start (a CS signal) generated at the startup period of the control circuit, to generate a driving signal for switching the switching element; and the initial state setting circuit is composed of a switch circuit that pulls down the CS signal to a ground potential and pulls up the FB signal to a voltage exhibiting an overload state for a predetermined period of time in the startup period of the control circuit to inhibit generation of the driving signal.

In some embodiments, the control circuit generates the driving signal for turning ON the switching element during a period from a timing at which the output signal of the oscillator, the oscillation frequency of which varies corresponding to the FB signal, becomes a minimum voltage to a timing at which the output signal of the oscillator exceeds a lower voltage of the FB signal and the CS signal.

In some embodiments, the initial state setting circuit is activated receiving a resetting signal issued when an internal power supply is generated for driving the control circuit receiving a power supply voltage applied to the control circuit, and let operation thereof terminated when the FB signal has reached a voltage indicating an overload state.

In some embodiments, the oscillator has a minimum oscillation frequency restricting function for regulating a lower limit of the oscillation frequency to a frequency higher than the audible frequency band.

In some embodiments, the oscillator charges and discharges a capacitor with a predetermined current and generates a signal having a triangular waveform with a voltage width regulated between a predetermined upper limit voltage and a lower limit voltage. And the minimum oscillation frequency restricting function is actualized by a timer circuit that discharges the capacitor forcedly below the lower limit voltage when a voltage of the signal having the triangular waveform does not reach the upper limit voltage in a specified period of time in a charging process of the capacitor.

In some embodiments, a switching power supply having a construction as stated above sets up an overload mode forcedly in the control circuit for driving a switching element in a startup period of the switching power supply. As a consequence, the control circuit starts operation in a state with an oscillation frequency reduced. Thus, the output voltage of the switching power supply main body gradually increases with soft start operation based on the CS signal, with which the VF signal also increases gradually. When the output voltage has reached a specified voltage level, the FB terminal voltage decreases below an overload voltage threshold value VthOLP and the control circuit transfers from an overload mode to a normal mode.

In some embodiments, because the output voltage monotonically rises up in the startup period, the switching power supply of the invention starts up stably without inviting troubles such as power-on resetting of an IC in the next stage connected to the secondary side output terminal, or malfunctioning of under-voltage locking out function. In addition, the construction of the invention only pulls down the CS signal to the ground potential and pulls up the FB signal to a voltage indicating an overload state in the startup period. Therefore, the switching power supply performs stable startup readily and effectively.

In some embodiments, because the oscillation frequency of the oscillator is restricted to a frequency higher than the audible frequency band as mentioned previously, a problem of so-called audible noise does not occur when the output current is restricted by reducing the oscillation frequency, which is a switching frequency. Thus, the present invention provides great advantages in practical application.

DETAILED DESCRIPTION

The following describes in detail a switching power supply according to a embodiments of the invention with reference to accompanying drawings.

Figure 5:
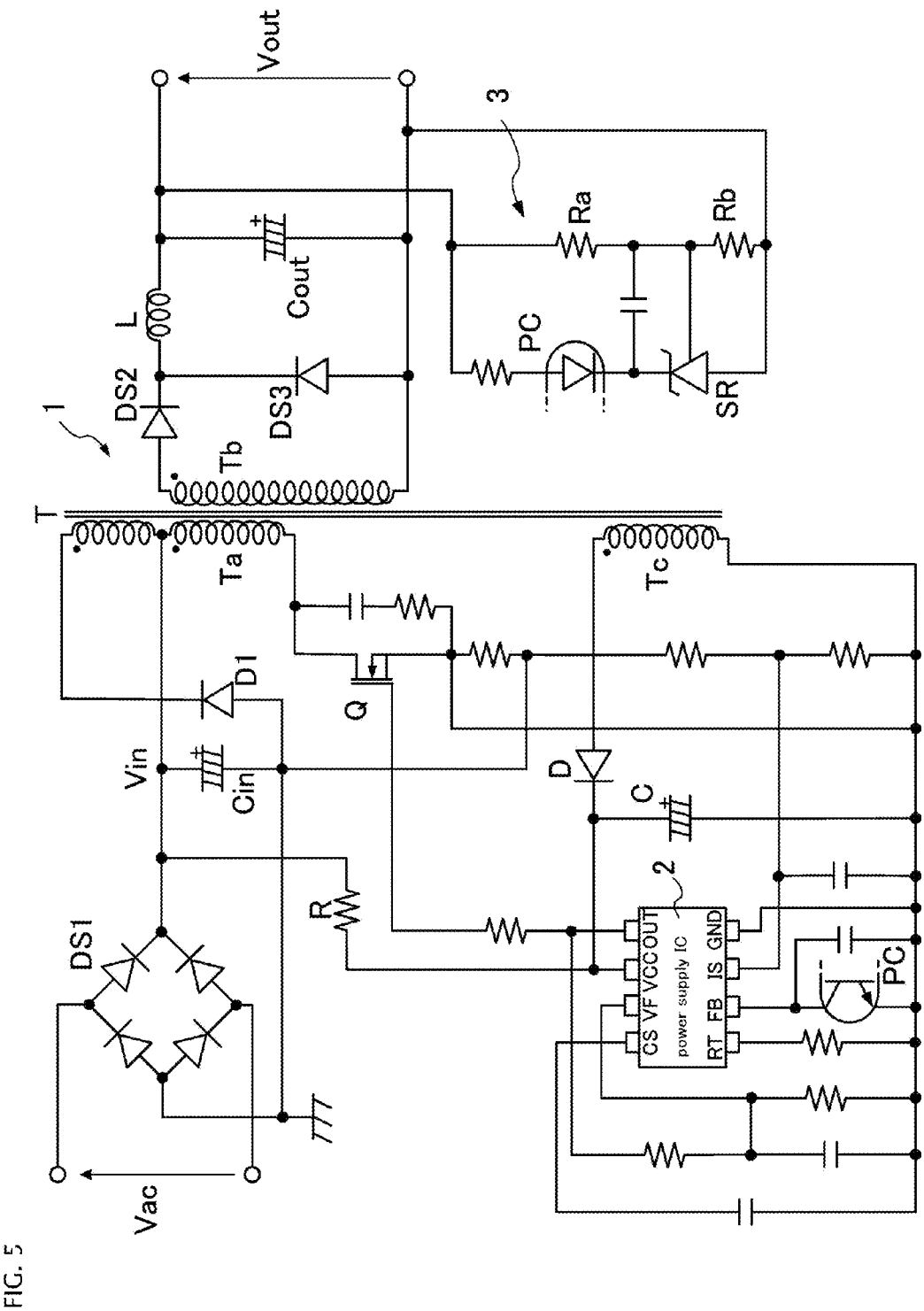
FIG. 5 shows a schematic construction of a conventionally common forward type switching power supply.

The switching power supply of some embodiments has a basic construction, for example, of the forward type switching power supply as shown in FIG. 5. A switching power supply main body 1 that mainly composes the switching power supply has a switching element Q, which can be a MOSFET, that conducts switching of an input voltage Vin through a primary winding Ta of a transformer T. The switching power supply main body 1 rectifies an AC voltage developing across a secondary winding Tb of a transformer T with diodes DS2 and DS3, and makes the rectified voltage smooth with a smoothing circuit composed of a reactor L and an output capacitor Cout to obtain a specified output voltage Vout.

Figure 1:
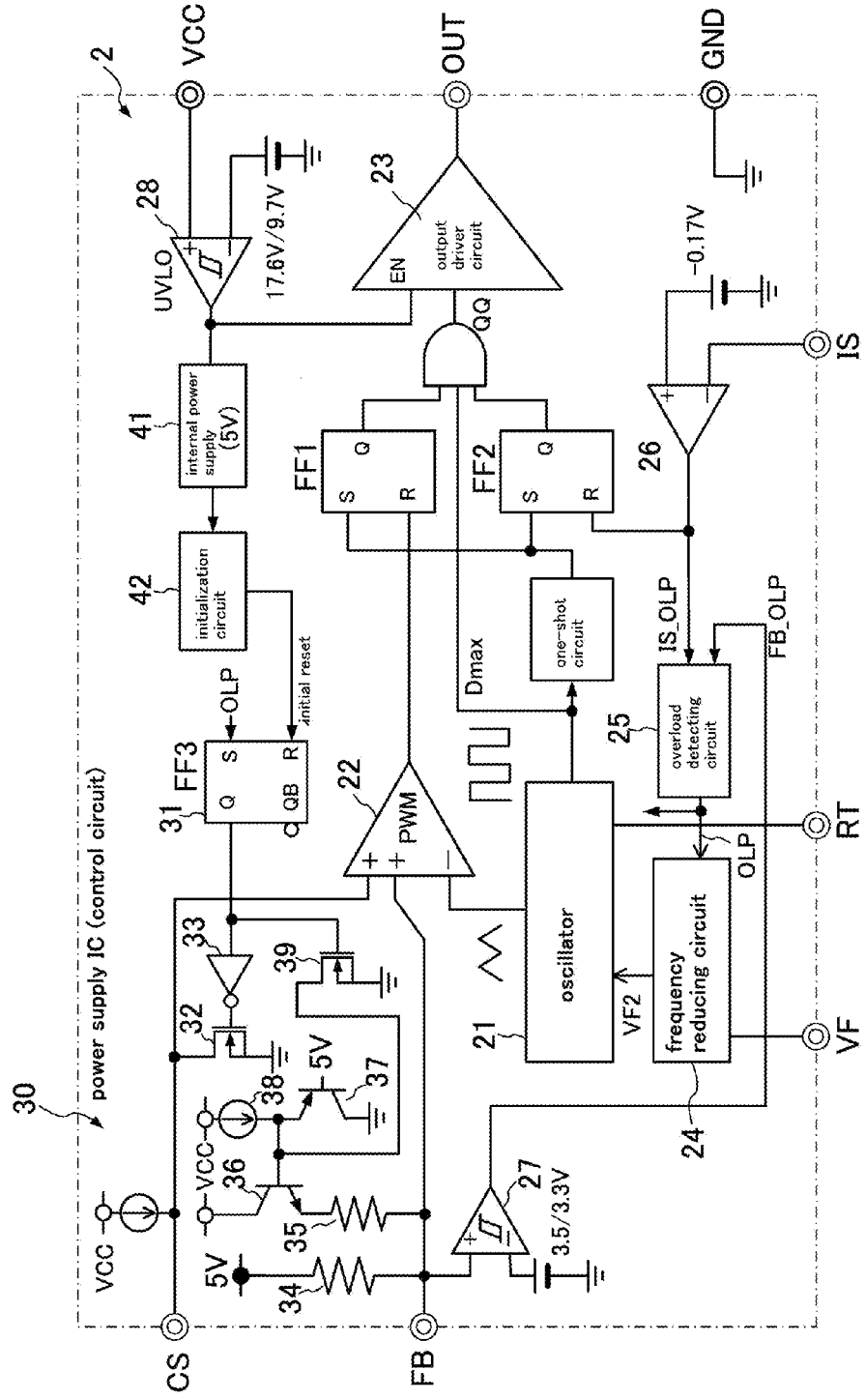
FIG. 1 shows a schematic construction of a control circuit, which is a power supple IC, of a switching power supply according to an embodiment of the present invention.

The switching power supply of this embodiment is characterized in that control circuit 2, which is a power supply IC 2, to control driving of the switching element Q has a function for forcedly setting up an overload mode at a startup period. FIG. 1 shows a schematic construction of the control circuit 2, a power supply IC 2, having a function for setting up an overload mode at a startup period, which is a distinguishing feature of the present invention. In FIG. 1 the same components as those in the conventional power supply IC 2 in FIG. 6 are given the same symbols.

Figure 6:
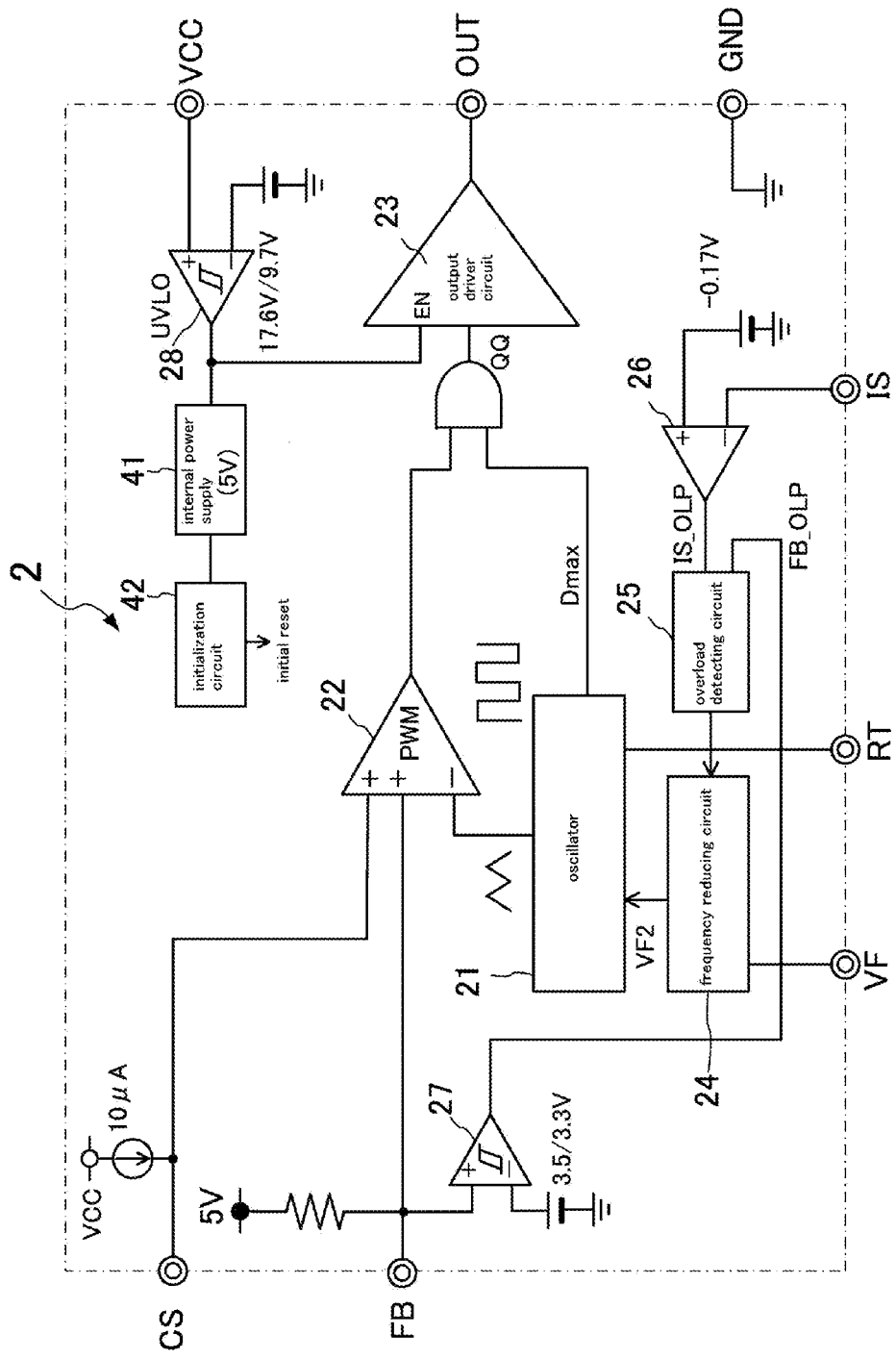
FIG. 6 shows a schematic construction of a conventional control circuit.

The power supply IC 2 of some embodiments of the present invention shown in FIG. 1 is characterized in that an initial state setting circuit 30 is provided for setting the power supply IC 2 (the control circuit 2) to an overload detecting state, i.e. an overload mode for a predetermined period of time in the startup period, in addition to the components provided in the conventional power supply IC2 shown in FIG. 6. The initial state setting circuit 30 has an RS flip-flop 31 that is reset on receiving an initial reset signal. The flip-flop 31 is set by an overload detecting signal OLP as described afterward.

The initial reset signal is issued by an initialization circuit 42 for a certain period of time. The initialization circuit 42 starts operation when an internal power supply circuit 41 starts delivering an internal power supply voltage at 5 V after the internal power supply circuit 41 starts to operate receiving an output of a comparator 28 for under-voltage locking out (UVLO). Thus, the initial reset signal is delivered from the initialization circuit 42 when the voltage applied to the power supply input terminal VCC reaches a minimum operation assuring voltage after increasing from the moment of startup of the power supply.

A first switch 32 is connected to the terminal CS of the power supply IC2 for receiving the CS signal to make the terminal CS short-circuited to the ground potential GND. The first switch 32, which can be composed of an n-channel MOSFET, receives an output of the flip-flop 31 after inversion by an inverter circuit 33 at the gate terminal of the first switch 32, and is ON/OFF-controlled. Accordingly, the first switch 32, as a result of reset of the flip-flop 31, pulls down the terminal CS to the ground potential to forcedly set the CS signal to zero volts.

To the terminal FB to which the FB signal of the power supply IC 2 is applied, connected is a resistor 34 that pulls up the terminal FB to the internal power supply voltage at 5 V and receives the FB signal. In addition to the resistor 34, the terminal FB is connected to a transistor 36 that pulls up the terminal FB to the voltage at the power supply input terminal VCC through a resistor 35. The transistor 36 turns ON receiving a bias current delivered by a constant current source 38 having a load of transistor 37. The transistor 36 is ON/OFF-controlled by a second switch 39, which can be a MOSFET, that is controlled by the output of the flip-flop 31. Thus, the transistor 36 turns ON upon reset of the flip-flop 31 and turns OFF upon set of the flip-flop 31.

When the transistor 36 turns ON, an external capacitor (indicated in FIG. 5), connected to the terminal FB is charged rapidly through the resistor 35. As a result, the terminal FB is pulled up forcedly to the internal power supply voltage at 5 V irrespective of the magnitude of the FB signal given to the terminal FB. The resistor 35 has a resistance of about 1 kΩ in the case of the resistance 34 of about 10 kΩ.

In the power supply IC 2 provided with the initial state setting circuit 30 having a construction described above, at a startup thereof with an input of power supply, the terminal CS is forcedly pulled down to the ground potential GND with resetting of the flip-flop 31, and the terminal FB is forcedly pulled up to the internal power supply voltage of 5V. This state is recognized as an overload state by the comparator 27 for overload detection that judges the voltage at the terminal FB, and an overload mode is set in the overload detecting circuit 25.

The overload detecting signal OLP from the overload detecting circuit 25 sets the flip-flop 31, which in turn terminates the pull down of the terminal CS and the pull up of the terminal FB. Therefore, the power supply IC 2 starts up, under control by the initial state setting circuit 30 operating in the startup period, in a state forcedly set to an overload mode in a predetermined period of time.

When the overload mode is set as described above and the flip-flop 31 is set, the external capacitor connected to the terminal CS, indicated in FIG. 5, starts to be charged, increasing gradually the voltage at the terminal CS, a CS signal. At the same time, an external capacitor connected to the terminal FB, indicated in FIG. 5, stops being charged. At this time, however, the output voltage Vout has not fully risen up, and thus, the output voltage detecting circuit 3, which works receiving the output voltage Vout, does not operate, too. Consequently, the FB signal is not fed back to the power supply IC 2 through the photocoupler PC. Thus, the power supply IC 2 stays in the overload mode set as described previously.

After that, the voltage at the terminal CS, the CS signal grows higher by charging on the external capacitor. When the CS signal exceeds a lower limit voltage threshold value Vlow, which is described later, in the oscillator 21, the oscillator 21 starts oscillation in a state controlled to a reduced oscillation frequency in the overload mode. As a consequence, the switching element Q starts being switched and is ON/OFF-driven in the state controlled to a reduced switching frequency.

Figure 2:
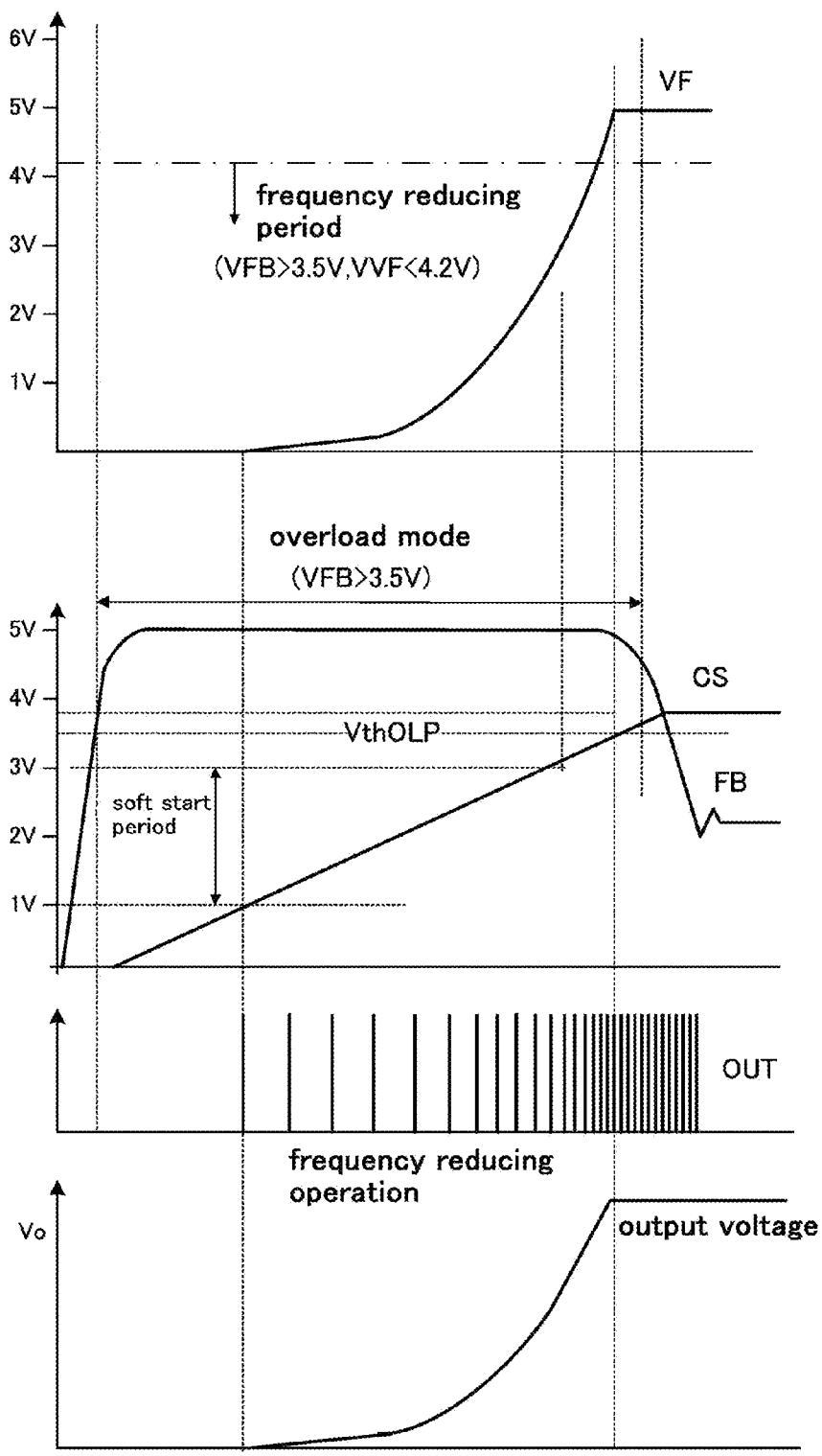
FIG. 2 shows variation of some signals in the switching power supply during operation in the startup period in an embodiment of the invention.
Figure 7:
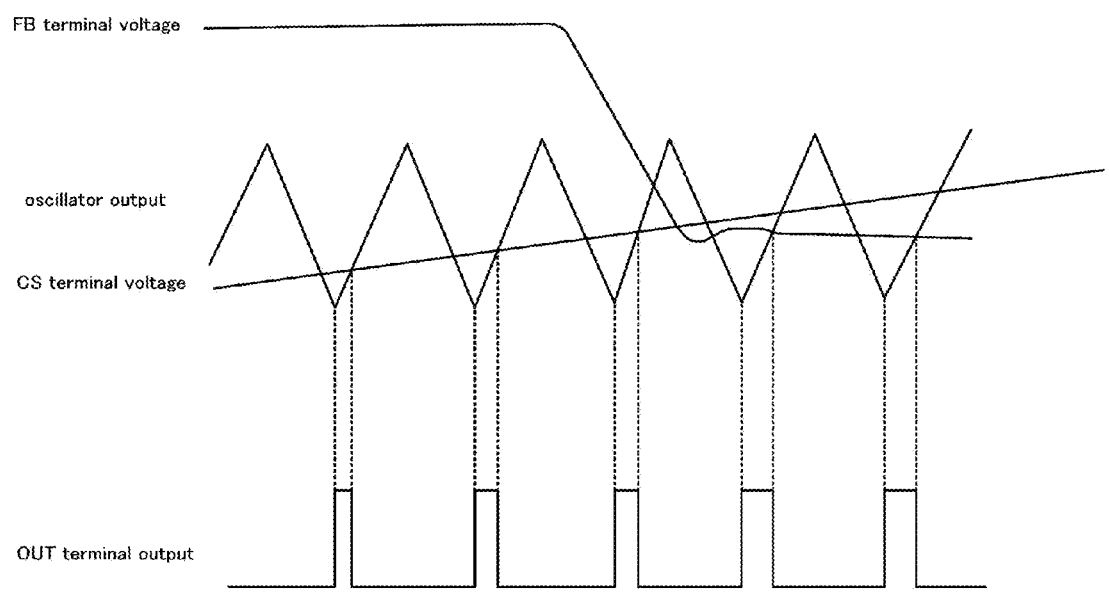
FIG. 7 shows signal waveforms indicating operation of a comparator for PWM control.
Figure 8:
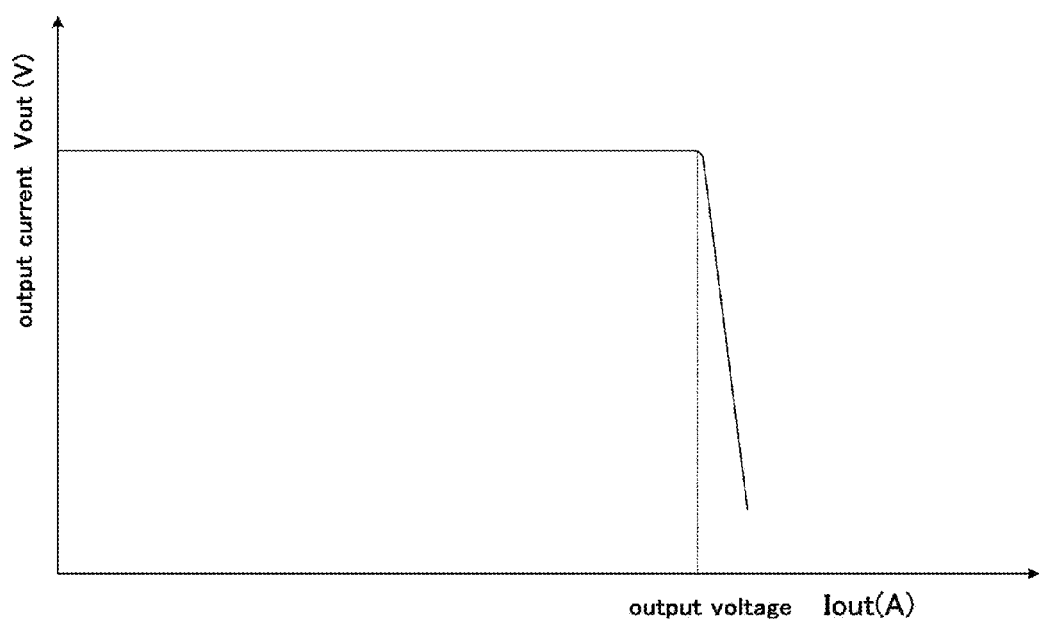
FIG. 8 shows voltage-current characteristic exhibiting drooping property.

Then the ON width of the driving signal OUT for driving the switching element Q increases with increase in the voltage at the terminal CS, the CS signal, as explained referring to FIG. 7, and thus the output voltage Vout gradually increases. With increase in the output voltage Vout, the voltage of the VF signal increases, which in turn increases the oscillation frequency of the oscillator 21. Thus, the frequency reducing control mentioned previously is terminated, and the operation mode is transferred to a normal model. FIG. 2 shows variation of signals in the startup period. The oscillator 21 starts oscillation operation from a low frequency in a condition controlled to a low oscillation frequency.

Thus, the switching element Q, after starting switching operation at a low switching frequency, gradually increases the switching frequency transferring to a normal mode in which the switching element Q is switching-driven at the predetermined frequency. After transition to the normal mode, the switching element Q has the ON width thereof controlled under pulse width modulation (PWM) control of the driving signal OUT based on the output voltage Vout. Thus, the output voltage Vout is settled to a constant value.

Figure 9:
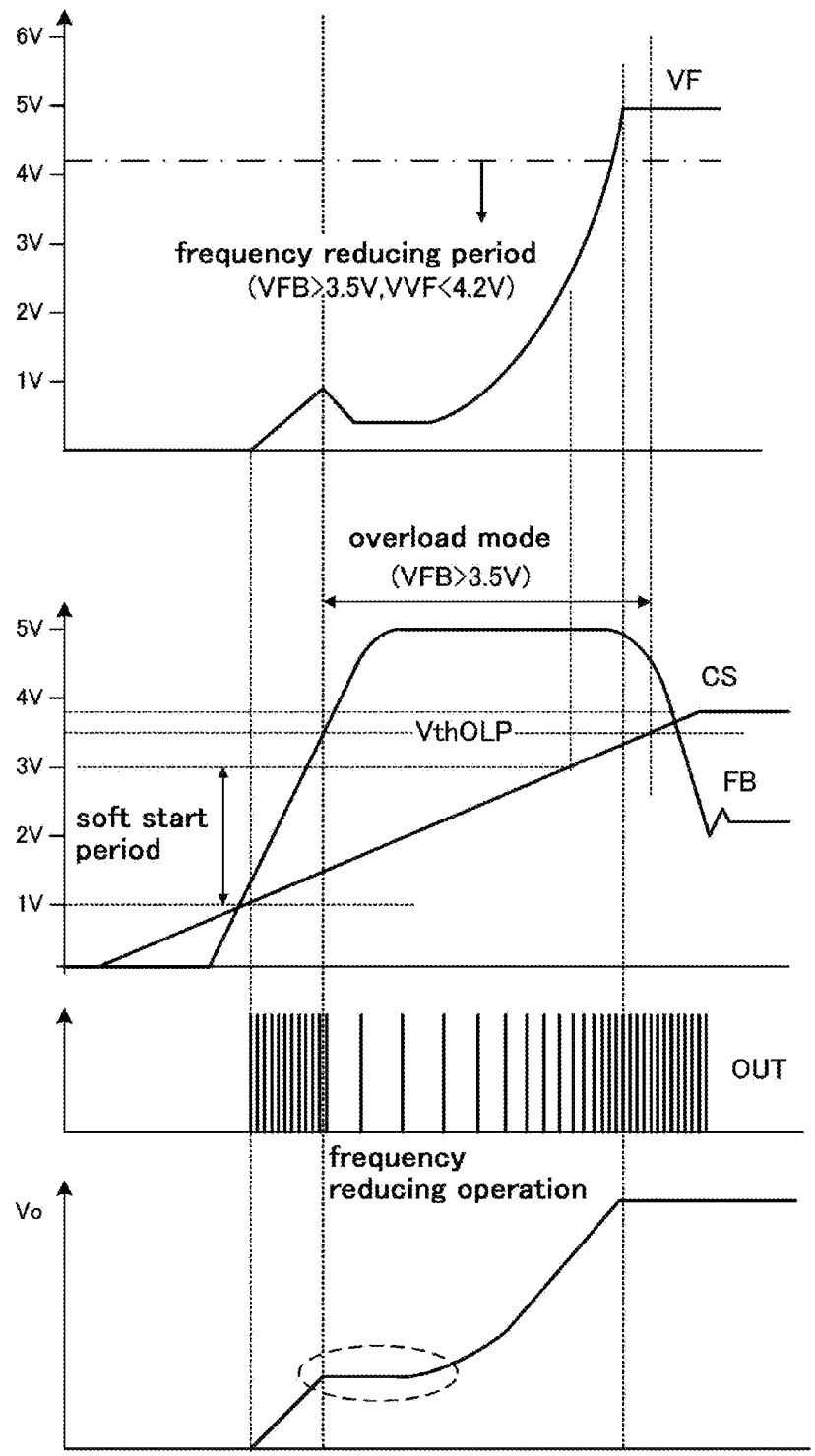
FIG. 9 shows variation of some signals in the switching power supply during operation in the startup period according to a conventional technology.

In the switching power supply of the embodiment, the output voltage Vout does not rise up with a step-wise procedure in the startup period as in the conventional power supply shown in FIG. 9. Instead, the output voltage Vout exhibits monotonic increase as shown in FIG. 2. Thus, the switching power supply of the embodiment does not cause troubles feared in the conventional power supplies, for example power ON resetting and malfunctioning of the under-voltage locking out function. Therefore, a switching power supply assures stable startup readily and effectively, thus providing a great practical advantage.

Now a description is presented here about the oscillator 21. As described previously, an overload mode is set up at the startup period and the oscillator 21 starts oscillation from a state controlled at a reduced oscillation frequency. Corresponding to this state of the oscillator 21, the switching element Q also begins switching from a state controlled at a reduced switching frequency. If the oscillation frequency of the oscillator 21 at the startup period is in the audible frequency band below 20 kHz, the switching operation of the switching element Q generates audible noise. Therefore, the minimum oscillation frequency of the oscillator 21 is preferably set at a frequency higher than the audible frequency band, for example, at 25 kHz.

Figure 3:
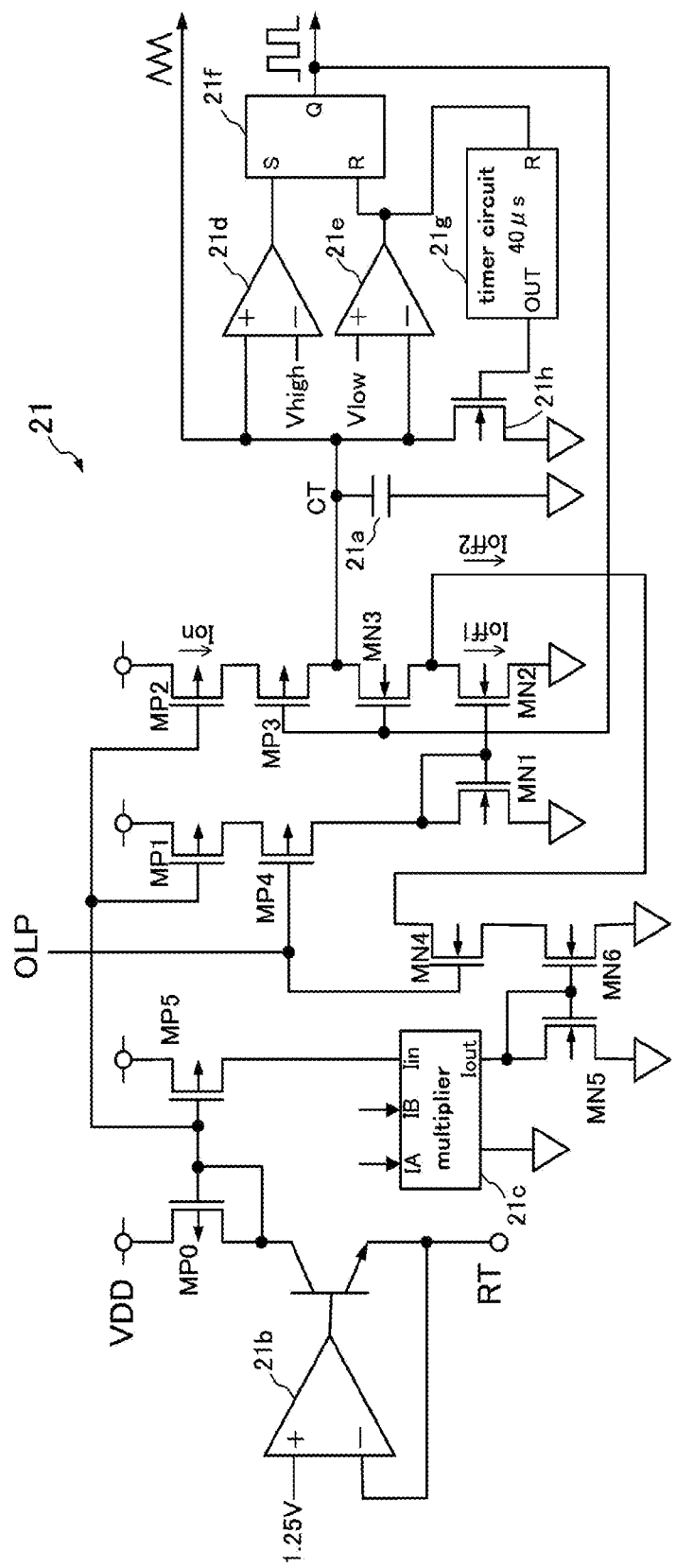
FIG. 3 shows a schematic construction of the oscillator in the control circuit shown in FIG. 1.

FIG. 3 shows a schematic construction of an example of oscillator 21 of a voltage controlled type with the minimum oscillation frequency of 25 kHz. This oscillator 21 comprises a capacitor 21a that is charging and discharging controlled, and a charged voltage thereon is changed into a triangular waveform. The charging or discharging of this capacitor 21a is controlled by transistors, which can be MOSFETs, MP3 and MN3 that are connected in series with each other and complementarily ON/OFF-controlled. The capacitor 21a is charged, when the transistor MP3 turns ON, with a charging current Ion through a transistor MP2. The capacitor 21a is discharged, when the transistor MN 3 turns ON, with a discharging current Ioff1 through a transistor MN2.

The charging current Ion through the transistor MP2 is regulated by a transistor MP0 that constructs a current mirror circuit in a pair with the transistor MP2. The discharging current Ioff1 through the transistor MN2 is regulated by a transistor MN1 that constructs a current mirror circuit in a pair with the transistor MN2. The current running through the transistor MN1 is regulated by a transistor MP1 that is connected in series with the transistor MN1 and constructs a current mirror circuit with the transistor MP0.

The transistor MP0 delivers a current proportional to the output current of a non-inverting amplifier 21b to the transistors MP1 and MP2, the output current being set corresponding to the external resistor (indicated in FIG. 5) connected to the terminal RT. Therefore, the external resistor connected to the terminal RT determines the time constant of charging and discharging of the capacitor 21a. The transistor MP0 is connected, in parallel to the transistors MP1 and MP2, to a transistor MP5 that constructs a current mirror circuit with the transistor MP0.

The current obtained through the transistor MP5 is supplied to the multiplier 21c and used for generating a discharging current Ioff2 for the capacitor 21a in the overload mode. The multiplier 21c receives current Iin delivered from the transistor MP5, current IA preliminarily determined, and current IB determined corresponding to a voltage level of the VF signal, and executes operation $$Iin \times IB/IA = Iout,$$

generating Iout for regulating the discharge current Ioff2.

Figure 4:
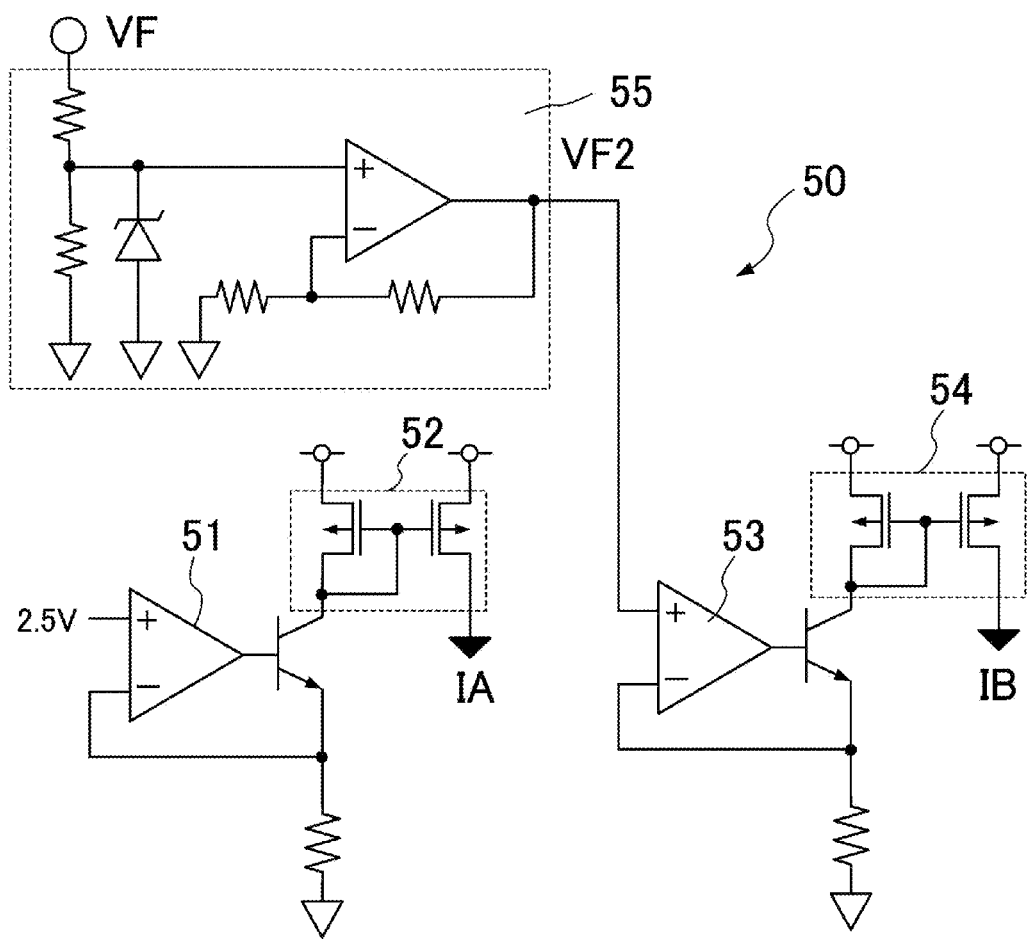
FIG. 4 shows an example of current generating circuits for the multiplier in the oscillator of FIG. 3.

The current IA and IB are generated by current generating circuits with construction shown in FIG. 4, for example. Specifically, the current IA is generated by extracting the output current of a buffer amplifier 51 through a current mirror circuit 52, in which the buffer amplifier 51 generates a current corresponding to a control voltage, for example 2.5 V, for starting the frequency reducing operation. The current IB is generated by extracting the output current of a buffer amplifier 53 through a current mirror circuit 54, in which the buffer amplifier 53 generates a current corresponding to a signal VF2 that is a level-adjusted VF signal.

The signal VF2 is generated in a VF level converting circuit 55 that divides the VF signal with resistors and sets a voltage to start frequency reducing control at 2.5 V by level adjustment through an amplifier. The VF signal is, as described earlier, a voltage of a smoothed driving signal OUT and proportional to ON duty. In the case the VF signal does not reach 2.5 V in the overload state, the output current Iout of the multiplier 21c is smaller than the current Iin by the current ratio IB/IA.

Now, returning to description about the oscillator 21, the output current Iout from the multiplier 21c is extracted through the current mirror circuit composed of the transistors MN5 and MN6. Between the transistor MN6 and the transistor MN3, a transistor MN4 is interposed, and between the transistor MP1 and the transistor MN1, a transistor MP4 is interposed. The transistors MP4 and MN4 are switches that conduct ON/OFF operation complimentarily according to the overload detecting signal OLP.

The transistor MP4 turns ON when the overload detecting signal OLP is at an L level and delivers the current from transistor MP1 to the transistor MN1, thereby setting the discharge current Ioff1 for the capacitor 21a through the transistor MN2. In this period, the transistor MN4 is in an OFF state and the MN6 is separated from the transistor MN2. As a result, the capacitor 21a is discharged with the current through the transistor MN2.

The transistor MN4 turns ON when the overload detecting signal OLP is at an H level and the transistor MN4 is connected in series to the transistor MN3. In this period, the transistor MP4 is in an OFF state and delivery of the output current from the transistor MP1 to the transistor MN1 is stopped to turn the transistor MN2 into an OFF state. Consequently, the capacitor 21a is discharged with a current that runs through the transistor MN6. As a result, the capacitor 21a, when an overload mode is set up, is discharged with a discharging current Ioff2 (<Ioff1) set based on the VF signal.

Supposing that the output current of each of the current mirror circuits in the above description is equal to the input side current, the discharging current Ioff2 from the capacitor 21a in the overload mode is smaller than the discharging current Ioff1 from the capacitor 21a in the normal mode, i.e., Ioff2<Ioff1. Consequently, the discharging rate of the capacitor 21a slows down and the oscillation frequency of the oscillator 21 decreases.

The terminal voltage CT of the capacitor 21a, which is charged and discharged as described above, is delivered to two comparators 21d and 21e that are disposed in parallel. The comparator 21d turns the output thereof to an H level when the terminal voltage CT has increased to a specified upper limit voltage threshold value Vhigh, and the comparator 21d sets an RS flip-flop 21f. The comparator 21e turns the output thereof to an H level when the terminal voltage CT has decreased to a specified lower limit voltage threshold value Vlow, and the comparator 21e resets the RS flip-flop 21f.

The output of the flip-flop 21f that is set and reset in this way turns the pair of transistors MP3 and MN3 complimentarily ON and OFF. As a consequence, the capacitor 21a is charged until the terminal voltage CT increases to the upper limit voltage threshold value Vhigh, and then discharged until the terminal voltage CT decreases to the lower limit voltage threshold value Vlow. This charging and discharging processes of the capacitor 21 are conducted repeatedly, and the terminal voltage CT is delivered as a signal with a triangular waveform at a specified frequency. The output of the flip-flop 21f that is set and reset in the way described above is delivered as a signal with a square waveform.

The output of the comparator 21e, which resets the flip-flop 21f, is also given to a timer circuit 21g as a resetting signal, i.e. an initialization signal. The timer 21g determines the minimum oscillation frequency of the oscillator 21. In the case of the minimum oscillation frequency of 25 kHz, for example, the timer circuit measures a time duration of 40 μs. The output of the tinier circuit 21g turns ON a switch 21h, which can be a MOSFET, connected in parallel with the capacitor 21g and discharges the capacitor 21a. After the discharge, the terminal voltage CT of the capacitor 21a decreases to the ground potential zero volts, which is lower than the lower limit voltage threshold value Vlow.

When the period for charging and discharging of the capacitor 21a is shorter than 40 μs and the oscillator 21 is oscillating at a frequency higher than 25 kHz, the timer circuit does not complete the clocking operation of 40 μs. While the timer circuit 21g is initialized receiving the resetting signal and start clocking 40 μs, in the case the period of changing and discharging of the capacitor 21 is shorter than 40 μs, the timer circuit 21g is reset by the output of the comparator 21e before completion of the clocking of 40 μs, and initialized to start again clocking the 40 μs. Therefore, the capacitor 21a is not forcedly discharged by the output of the timer circuit 21g unless the oscillation frequency of the oscillator 21 is lower than 25 kHz.

However, when the discharging current from the capacitor 21a decreases to Ioff2 in the overload mode and the discharging time is elongated, the period of charging and discharging of the capacitor 21a becomes longer than 40 μs. Then, the timer circuit 21g completes clocking of 40 μs before resetting by the comparator 21e. As a consequence, the timer circuit 21g turns the switch 21h ON and the capacitor 21a is forcedly discharged, limiting the period of charging and discharging of the capacitor 21a to 40 μs. In other words, the minimum oscillation frequency of the oscillator 21 is limited to 25 kHz.

The control circuit 2 constructed having the oscillator 21 with the construction described above does not invite the problem of audible noise even in the case in which an overload mode is set up at the starting period and the switching frequency of the switching element a is reduced. Even in the case the overload mode is set up at the startup period and the switching operation of the switching element Q is started with the driving signal OUT exhibiting an oscillation frequency that is reduced corresponding to the voltage of VF signal, the switching frequency can be set at higher than 25 kHz in the startup period. Therefore, the switching power supply starts operation without inviting the problem of audible noise.

Embodiments of the invention are not limited to the embodiment described thus far. Whereas the switching power supply is a forward type in the above description, the present invention can also be applied to a switching power supply of flyback type. In such a case, a voltage that is obtained by dividing the VCC terminal voltage and is proportional to the VCC terminal voltage is given to the VF terminal. In order to detect overload and reduce a switching frequency, the method disclosed in Patent Document 1, for example, can be employed, as well as other appropriate techniques. The present invention can be applied with various modifications within the spirit and scope of the invention.

What is claimed is:

1. A switching power supply comprising:
   a switching power supply main body configured to switch an input voltage through a switching element at a specified frequency to apply the switched voltage to a primary winding of a transformer, and rectify and smooth an AC voltage developed across a secondary winding of the transformer to obtain a specified output voltage;
   a control circuit configured to conduct feedback control of a pulse width of a driving signal for switching the switching element according to the output voltage of the switching power supply main body and settle the output voltage to a specified voltage level;
   a frequency reducing circuit that is disposed in the control circuit and is configured to reduce a frequency of the driving signal for switching the switching element upon detection of an overload state of the switching power supply main body and limit an output current of the switching power supply; and
   an initial state setting circuit that is configured to set the control circuit to an overload detecting state for a predetermined period of time in a startup period of the control circuit,
   wherein
   the control circuit is further configured to compare an output signal of an oscillator, an oscillation frequency of which varies corresponding to a feedback voltage generated by detecting the DC output voltage of the switching power supply main body, with the feedback voltage, and compare the output signal of the oscillator with a control voltage for soft starting generated at the startup period of the control circuit, to generate a driving signal for switching the switching element; and
   the initial state setting circuit is composed of a switch circuit that is configured to pull down the control voltage for soft starting to a ground potential for a predetermined period of time in the startup period of the control circuit to inhibit generation of the driving signal, and to pull up the feedback voltage to a voltage exhibiting an overload state.

2. The switching power supply according to claim 1, wherein
the control circuit is further configured to gates the driving signal for turning ON the switching element during a period from a timing at which the output signal of the oscillator, the oscillation frequency of which varies corresponding to the feedback voltage, becomes a minimum voltage, to a timing at which the output signal of the oscillator exceeds a lower voltage of the feedback voltage and the control voltage for soft starting.

3. The switching power supply according to claim 1, wherein
the initial state setting circuit is configured to be activated by receiving a resetting signal issued when an internal power supply is generated for driving the control circuit receiving a power supply voltage applied to the control circuit, and operation thereof is terminated when the feedback voltage has reached a voltage indicating an overload state.

4. The switching power supply according to claim 1, wherein
the oscillator is configured to have a minimum oscillation frequency restricting function for regulating a lower limit of the oscillation frequency to a frequency higher than an audible frequency band.

5. The switching power supply according to claim 4, wherein
the oscillator charges and discharges a capacitor with a predetermined current and generates a signal having a triangular waveform with a voltage width regulated between a predetermined upper limit voltage and a lower limit voltage, and
the minimum oscillation frequency restricting function is actualized by a timer circuit that discharges the capacitor forcedly below the lower limit voltage when a voltage of the signal having the triangular waveform does not reach the upper limit voltage in a specified period of time in a charging process of the capacitor.

* * * * *